United States Patent [19]

Hammer

[11] Patent Number: 5,375,442
[45] Date of Patent: Dec. 27, 1994

[54] CLAMP ASSEMBLY FOR A TRAILER OR LIKE WHEELED VEHICLE

[76] Inventor: Robert N. Hammer, 10120 SW. 40th St., Miami, Fla. 33165

[21] Appl. No.: 54,622

[22] Filed: Apr. 28, 1993

[51] Int. Cl.$^5$ .............................................. B60K 25/00
[52] U.S. Cl. ..................................... 70/226; 70/14; 188/32
[58] Field of Search .............. 70/226, 225, 14, 18, 70/259; 188/32

[56] References Cited

U.S. PATENT DOCUMENTS

| D. 221,417 | 8/1971 | Prichard | 70/18 |
|---|---|---|---|
| 1,317,329 | 9/1919 | Shorday | 188/32 |
| 1,370,364 | 3/1921 | Rodriquez | 188/32 |
| 3,695,071 | 10/1972 | West | 70/225 |
| 3,713,668 | 1/1973 | Flindt | 70/226 |
| 3,884,057 | 5/1975 | Maurer | 70/259 |
| 4,768,359 | 9/1988 | Wade | 70/226 |
| 4,819,462 | 4/1989 | Apsell | 70/226 |
| 4,833,442 | 5/1989 | Von Heck | 70/226 |
| 4,913,265 | 4/1990 | Richards | 70/226 |
| 5,137,121 | 8/1992 | Leonard | 70/226 |

FOREIGN PATENT DOCUMENTS 2112725  7/1983  United Kingdom .................. 70/226

Primary Examiner—Peter M. Cuomo
Assistant Examiner—Darnell M. Boucher
Attorney, Agent, or Firm—Malloy & Malloy

[57] ABSTRACT

A clamp assembly to effectively lock and or prevent a wheel on a trailer or like wheeled vehicle from rotating to in turn prevent the unauthorized movement or theft of the trailer including two clamp members movable towards and away from one another and wherein each clamp member is disposed in overlying and or confronting engagement with either the front face or rear face of the wheel. The two clamp members may be positioned and locked into an operative position such that the various components of the two clamp members adapted to collectively surround a peripheral or tread portion of the wheel are positioned such that rotation of the wheel is impossible due to the fact that the clamp assembly will eventually come into contact with the undercarriage of the vehicle upon attempted rotation of the wheel through unauthorized movement of the trailer.

13 Claims, 3 Drawing Sheets

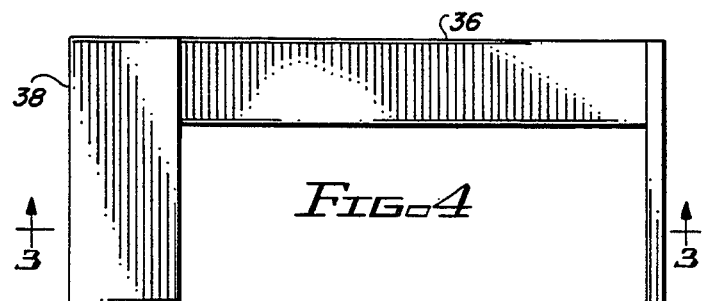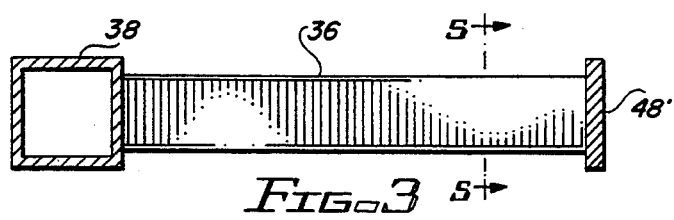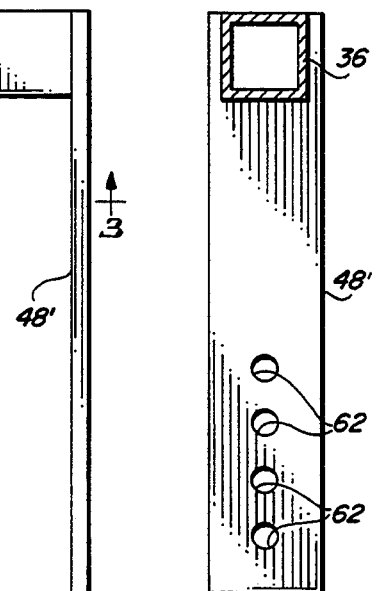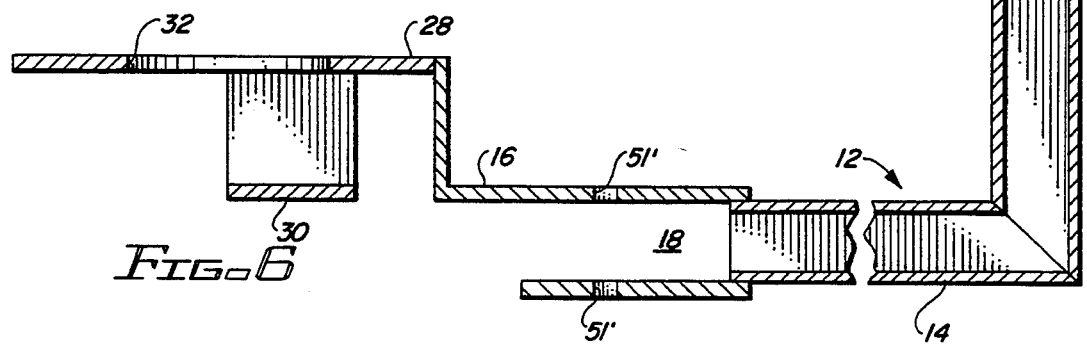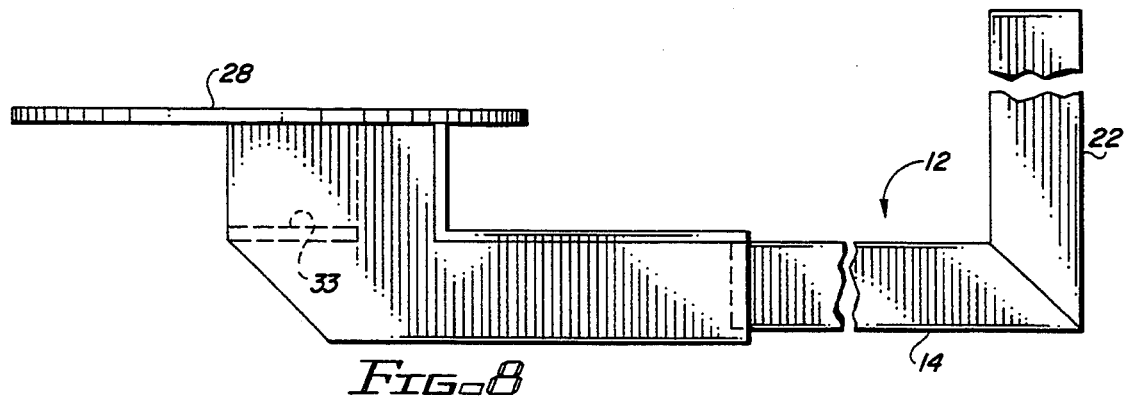

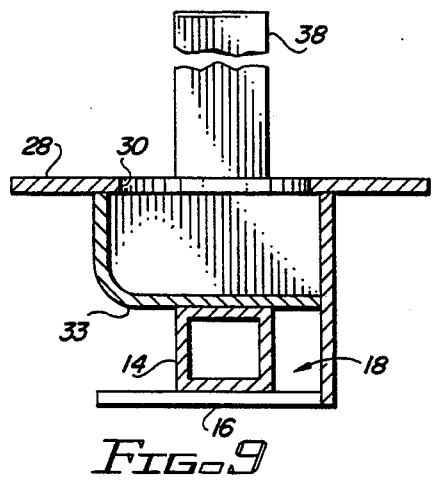
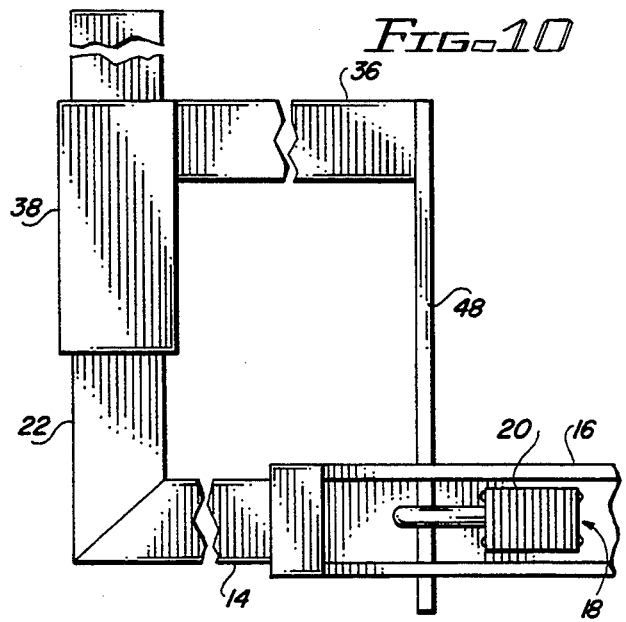
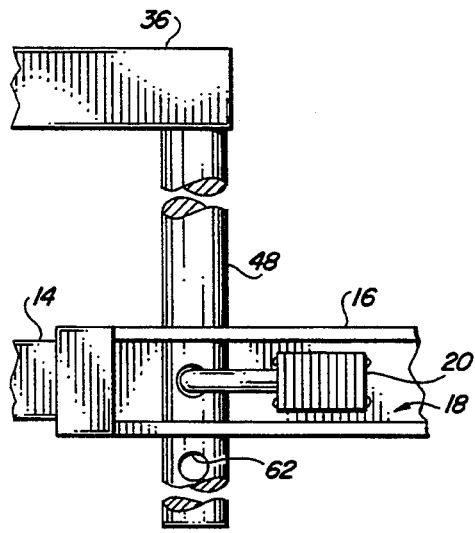
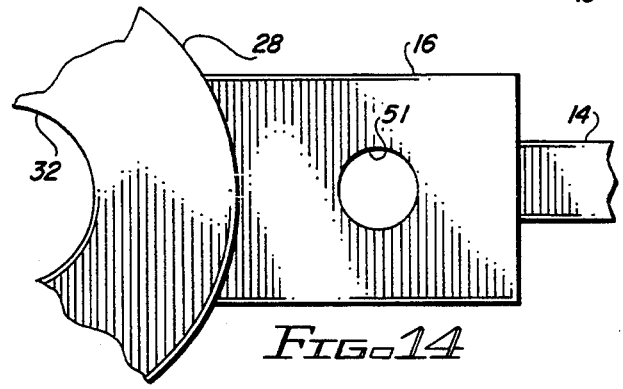
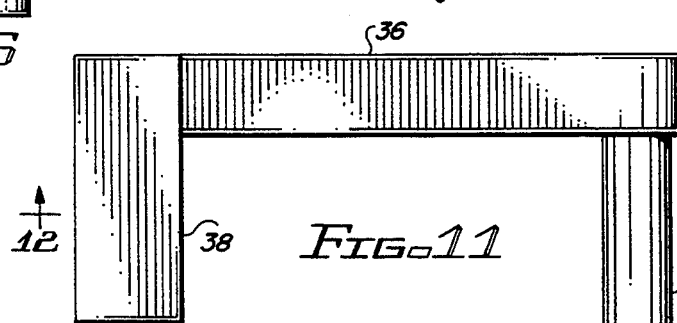
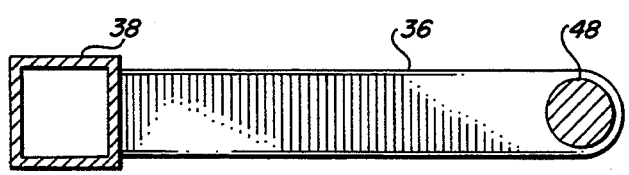
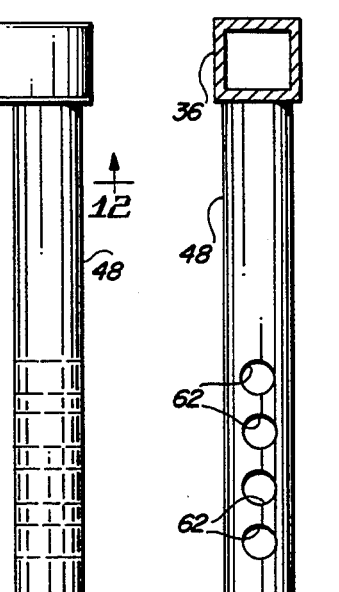

CLAMP ASSEMBLY FOR A TRAILER OR LIKE WHEELED VEHICLE

BACKGROUND OF THE INVENTION

1. Field of the Invention

This invention relates to a clamp assembly to prevent the inadvertent or unauthorized rotation of a wheel of the type mounted on a wheeled vehicle such as but not limited to a trailer or like structure.

2. Description of the Prior Art

Wheeled vehicles, commonly termed trailers which are specifically designed to be towed behind automobiles, trucks, vans or like powered motor vehicles are quite common and used extensively throughout the United States as well as other industrialized countries in the world. In recreationally oriented states such as Florida, California, etc. numerous trailer designs are available and specifically adapted to carry a boat or like marine craft for purposes of allowing the boat to be easily transported to various locations desired for use by the owner or operator. One problem associated with such trailer like vehicles or other vehicles specifically intended to be towed, is the ease in which such vehicles are stolen. This is due primarily to the fact that the sophistication of modern day thievery and the ability to defeat such common locking devices as padlocks, chains, etc. is greatly facilitated. Accordingly devices aimed at preventing the inadvertent removable of such trailers or like wheeled vehicles from their parked position are, for the most part ineffectual and accordingly are not readily commercially available.

Prior art attempts to overcome such problems as set forth above are evidenced and generally represented in the following U.S. Patents.

The patent to Flindt Et. Al., U.S. Pat. No. 3,713,668 discloses a protective device for a trailer and or like vehicle intended to prevent the theft of such vehicle which includes an eye bolt adapted to be screwed in threaded engagement with a wheeled member of the vehicle and wherein such patent further includes a linking member which is linked through the eye of the eye bolt in a round and accessible structural member of the vehicle. A coupling element such as a lock for securing the linking member in a closed loop is also included. One disadvantage of such a structure is that it incorporates the same or what may be considered substantially conventional chain like members for establishing the security of the device. Numerous means are available to one intent on stealing the vehicle to "defeat" a chain or other similar type of structural component of a prior art locking assembly of the type disclosed in this patent.

The patent to Quimby, U.S. Pat. No. 3,868,837 discloses a wheel lock for vehicle wheels designed to restrain vehicle wheel rotation as well as removal of the wheel from the axle of the vehicle and includes a pair of mating members encompassing a peripheral portion of the wheel mounted tire wherein the mating members contact the rim of the vehicle on which it is mounted so as to restrain the wheel rotation. A bolt is present in each of the mating members as well as a flat mating face arranged perpendicularly to the bolt accepting passage. The remaining face of each member has at least one protruding tab and one receiving recess arranged on opposite sides of the passage. A corresponding tab and recess on the mating faces are arranged to interfit and align with each other when the members are in a mated condition with the mating faces in contact. Operability or Utility of a structure of this type is not questioned but the overall complexity and reliability is dependent upon certain strength of materials of certain components. The device somewhat resembles a cap or grip mechanism attached to the tire portion of the wheel which prevents its rotation. There is no access of the subject structure to the axle of the wheel on which it is mounted.

The patent to Barr, U.S. Pat. No. 4,122,693 is directed to a guard or protective casing for padlocks which of course is known to be available and present in the prior art. The guard includes a housing having a cavity in one end thereof and a first relief in the housing adjacent to the one end for receiving into the cavity a shackled portion of an associated padlock. There is also provided a second relief in the housing opposite to the first relief and adjacent to the one end thereof for receiving into the cavity and associated member to be secured by the padlock. This device is not specifically directed to the protection of unauthorized travel or movement of wheeled vehicles but primarily to the concept of preventing access by any type of tools such as a cutter to the padlock itself.

Even in light of the attempts in the prior art, as evidenced by the above noted U.S. Patents, there is still a need in this area for an effective and efficient locking assembly particularly designed to be used with a trailer or like wheeled vehicle which can be easily attached, is reliable from the extent of preventing unauthorized movement of the device and which is inexpensive to initially purchase and be maintained so as to be more attractive to the ultimate consumer. Also a preferred assembly of this type should be structured to include sufficient versatility to be used on a number of wheeled vehicles other than a boat trailer or like device.

SUMMARY OF THE INVENTION

The present invention relates to a clamp assembly specifically designed to prevent the unauthorized rotation of a wheel mounted on a wheeled vehicle, such as but not limited to a boat trailer or like trailer device primarily intended to be towed behind a powered vehicle. It should be apparent however that the clamp assembly of the present invention is well adapted to be utilized for the unauthorized clamping, locking, etc. of a wheel mounted on vehicles other than a trailer or vehicle intended to be towed.

More specifically, the clamp assembly of the present invention comprises a first clamp member disposed, when in its operative position to somewhat overly and at least partially confront an outer or front face of the wheel being locked. In addition a second clamp member is provided in movable, adjustable attachment to the first clamp member. The second clamp member is designed to be positioned adjacent to and somewhat overlying relation to an inner or rear face of the wheel being clamped. Each of the first and second clamp members are cooperatively adapted so as to be selectively positionable towards and away from one another in order to adjust and adapt to the size of the wheel being locked as well as other structural components of the wheel and or the vehicle on which the wheel is mounted. Further cooperative adaptation of the first and second clamp members is such as to collectively surround an outer or peripheral portion of the wheel such that when the clamp assembly is in the aforementioned operative position, the wheel will be prevented from effective rotation. This is due to the fact that the clamp assembly when locked into its operative position in somewhat surrounding relation to the wheel will eventually engage an undercarriage portion of the vehicle thereby rendering efficient rotation of the wheel impossible. This in turn will of course prevent inadvertent or unauthorized movement of the trailer from its intended, parked position.

The subject clamping assembly further includes a locking means which is mounted, at least in part, on both the first and second clamp members in cooperative relation to one another such that the first and second clamp members can be locked in the operative, locking position relative to the wheel on which they are mounted. The locking means comprises an elongated locking element having one end secured to the second clamp member and extending transversely outward from the second clamp member transversely through an appropriately positioned and configured opening in the wheel. The outer or free end of this locking member engages other components of the subject locking assembly. Such other components include a hollow interior casing fixedly secured to the first clamp member and structurally adapted to allow passage of the elongated locking member therein and therethrough. A lock, such as a padlock, combination lock or other type of substantially conventional lock mechanism is attached on the interior of a lock casing to the elongated locking element in order to prevent inadvertent or unauthorized removable of the locking element from its interior securement within the casing and also from preventing someone from removing the elongated locking element from passing transversely through the wheel itself. The casing is adapted to restrict access to the lock which engages the elongated locking element. Such restrictive access is generally limited to the fact that conventional cutting tools or other tools used to remove the lock in an unauthorized manner, from its locked position on the locking element would be virtually impossible. However one with the appropriate key or the like could, through such limited access efficiently remove the lock from the locking element thereby allowing the owner or other authorized personnel to remove the clamping assembly from its operative, locked position about the wheel.

Further components of the first clamp member include a stabilizing plate which is used to properly orient and position as well as stabilize the first clamp member as it confronts the outer surface or face of the wheel and particularly a center hub portion thereof. At the opposite end of the first clamp member there is provided an elongated connecting arm extending transversely outward from the opposite or free end of a base portion relative to where the lock casing and stabilizing plate are mounted. This connecting arm is disposed and otherwise adapted to substantially over lie in outwardly spaced relation to the outer periphery or tread portion of the wheel being locked.

The second clamp member includes a receiving sleeve or like receiving structure adapted to slidingly engage and at least partially surround the connecting arm and, in certain preferred embodiments to be described in greater detail hereinafter, such sleeve is attached to a base portion of the second clamp and is generally oppositely disposed relative to the elongated, transversely oriented locking element. The sleeve may include a somewhat elongated configuration and have a hollow interior along its length and be disposed to coaxially receive the connecting arm of the first clamp member therein so as to allow sliding movement of such connecting arm therethrough. Therefore the operative positioning of the first and second clamp member may occur by moving such clamp member towards or away from one another such that the base portions of each first and second clamp members are disposed immediately adjacent to and or in confronting relation to the inner and outer surfaces or faces of the wheel which is being locked. Meanwhile when in such operative position the receiving structure or sleeve of the second clamp member and the connecting arm of the first clamp member are disposed in sliding engagement with one another and are disposed in outwardly spaced relation to the periphery or thread portion of the wheel being locked. Collectively therefore both the first and second clamp member are structurally adapted to define a receiving opening through which the periphery of the wheel being locked passes. Accordingly, while the locking member passes transversely through a somewhat center portion of the wheel, the slidingly engaged connecting arm and sleeve are disposed outwardly from the outer periphery or tread portion of the wheel and further the base portions of the first and second clamp member complete the enclosed boundaries of the aforementioned receiving opening through which the periphery of the wheel passes.

Other features of the present invention will be described in greater detail with regard to specific differences in certain operative features in connections to the different preferred embodiments.

BRIEF DESCRIPTION OF THE DRAWINGS

For a fuller understanding of the nature of the present invention, reference should be had to the following detailed description taken in connection with the accompanying drawings in which:

FIG. 3 is a sectional view along line 3—3 of FIG. 4 showing sections of the components of one clamp member of the subject assembly.

FIG. 4 is a top view of the embodiment of FIG. 3.

FIG. 5 is a sectional view along line 5—5 of FIG. 3.

FIG. 6 is a transversectional view along line 6—6 of FIG. 7.

FIG. 8 is a top view of the embodiment of FIG. 6 and 7.

FIG. 9 is a sectional view and partial cutaway in detail.

FIG. 10 is a top view of the embodiment of FIG. 2 in assembled form.

FIG. 11 is a top view of one clamp member of the clamp assembly and embodiment of FIG. 1.

FIG. 12 is a sectional view along line 12—12 of FIG. 11.

FIG. 13 is an end sectional view of the embodiment of FIG. 11.

FIG. 14 is a partial cutaway view of a detailed portion of the embodiment of FIG. 1.

FIG. 15 is a bottom sectional view and partial cutaway of the embodiment of FIG. 1.

Like reference numerals refer to like parts throughout the several views of the drawings.

DETAILED DESCRIPTION OF THE PREFERRED EMBODIMENT

Figure 1:
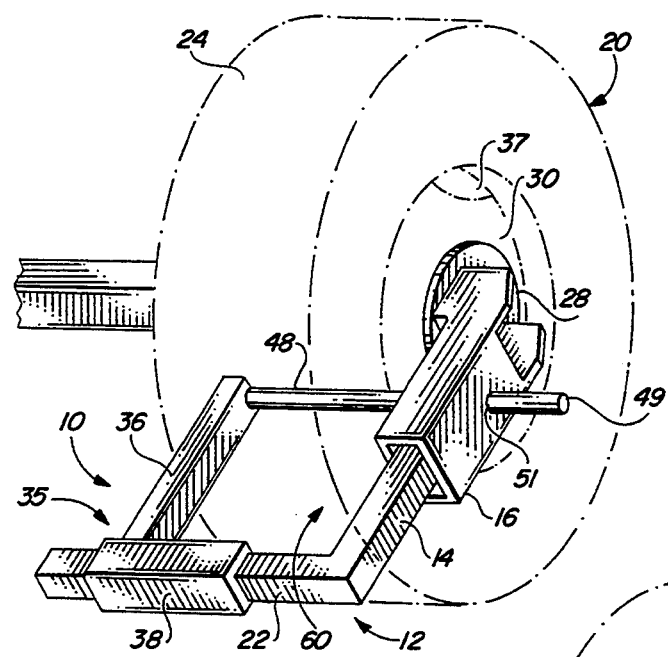
FIG. 1 is a perspective view of one preferred embodiment of the present invention with the wheel being locked and shown in at least partially phantom lines.
Figure 2:
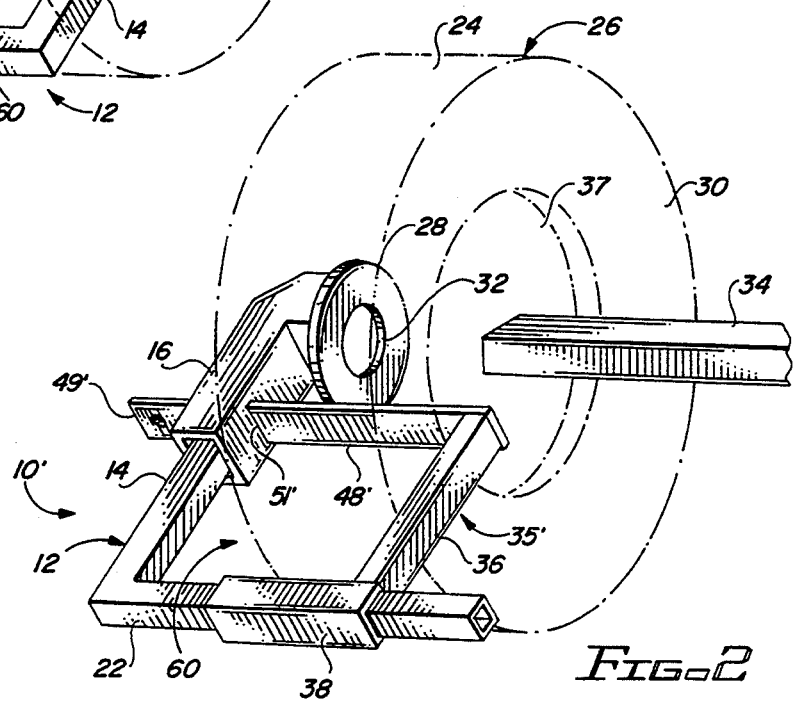
FIG. 2 is a perspective view of yet another embodiment of the present invention similar to that of FIG. 1 with the wheel being locked and shown in at least partially phantom lines.
Figure 7:
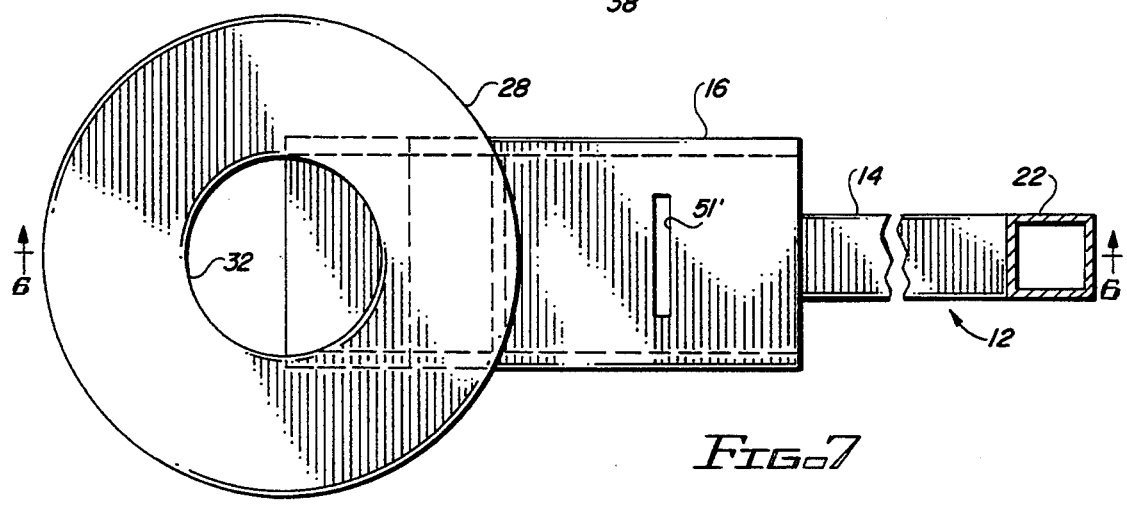
FIG. 7 is a front view of the embodiment of FIG. 6.

As shown in FIGS. 1 and 2, the clamp assembly of the present invention is represented as 10 and 10' respectively in two separate but equally preferred embodiments. In each of these embodiments the basic construction and operation of the clamp assembly is the same but the configuration and or structural adaptation of a locking element considered an important part of each clamp assembly 10 and 10' differ somewhat.

In each of the embodiments of the clamp assemblies 10 and 10' a first clamp member generally indicated as 12 includes a base portion 14 having a lock casing 16 attached substantially to one end thereof. The casing has a hollow interior as at 18 (see FIGS. 6, 10 and 15) in which a lock member 20, which may be of substantially conventional design, may be positioned. At the opposite end of the base 14 of the first clamp member 12 there is fixedly mounted a connecting leg as at 22 extending substantially transversely outward from the base 14 and in spaced but somewhat overlying relation to a tread or peripheral portion 24 of a wheel shown in FIGS. 1 and 2 and generally indicated as 26.

As can be seen in FIGS. 1 and 2 the first clamp member 12 is positioned so as to substantially overly a front or outer face of the wheel 26. To this end a stabilizing plate as at 28 is also fixedly mounted to the base 14 at a common end relative to the casing 16. More specifically the stabilizing plate 28 is affixed to the casing 16 and is adapted to confront the outer surface of a hub or center portion of the wheel as at 30. Further, the stabilizing plate 28 has a central aperture as at 32. This central aperture 32 of the plate 28 is adapted to receive and allow at least minimal passage therethrough of an outer most end of an axle portion as at 34 (see FIG. 2). Further, with regard to the stabalizing plate 28, a barrier member or bar as at 33 is disposed in outwardly spaced but somewhat overlying relation to the central aperture 32. This barrier bar is to essentially cover the end most portion of the axle and any connecting facility which serves to attach the wheel 26 to the axle. The existence of this barrier member or bar 33 will prevent the unauthorized removal of the entire wheel from the axle on which it is mounted even when the subject clamp assembly is in its operative position as clearly shown in FIGS. 1 and 2.

As shown initially in FIGS. 1 and 2 the respective clamp assemblies 10 and 10' each include a second clamp member generally indicated as 35 and 35'. Each of the second clamp members include a base portion 36 having a receiving sleeve 38 attached to one distal end thereof. The receiving sleeve 28 has a hollow interior and is specifically disposed and adapted to allow sliding reception therein of the elongated connecting leg 22 of the first clamp member 12. The opposite end of the base 36 has a locking element as at 48 and 48' attached thereto and extending transversely outward therefrom. Importantly, the locking element has an elongated configuration and is configured, differently, in each of the two embodiments of FIGS. 1 and 2. More specifically the locking element 48 of FIG. 1 is in the form of a substantially cylindrical pin extending transversely through a center portion 30 of the wheel 26 through one of the apertures as at 37. The locking element 48' in the embodiment of FIG. 2 includes the adaptation and configuration of a substantially elongated flat bar like shape and the locking element is also attached at one end approximate to the base 36 of the second clamp member and being oppositely disposed to the receiving sleeve 38. The free end as at 49 and 49' of each of the locking elements 48 and 48' respectively is intended to pass through congruently configured apertures in the respective casings 16. These apertures as at 51 and 51' are formed in oppositely disposed faced apart sidewalls of the casing as clearly shown in FIGS. 6, 7, 14 and 15. More specifically in the embodiment of FIGS. 11 through 15, the apertures in the spaced apart sidewalls of the casing 16 are substantially round so as to receive and adapt to the cylindrical configuration of the pin like locking member 48 of the embodiment of FIG. 1. For purposes of clarification the round apertures are indicated as 51 in the embodiment of FIGS. 11 through 15 wherein the elongated slot like apertures 51' are indicated in FIG. 6 and are congruently configured to receive and allow passage therethrough of the elongated bar like element 48' defining the locking element of the embodiment of FIG. 2.

The primary difference for the shape or configuration difference between the embodiments of FIGS. 1 and 2 is that the center or hub portion 30 of the wheels each include apertures as at 37 which may vary. Aperture 37 in hub 30 in FIG. 1 is structured to allow passage therethrough of a substantially cylindrical or round cross sectional configuration locking element 48 wherein the apertures 37' in the central portion 30 of wheel 26 is configured to allow passage of a flat bar like element 48'. Accordingly the difference in shapes of a locking element 48 and 48' between a pin like element and a bar like element are made herein.

The first and second clamp members 12 and 35 of the first clamping assembly 10 and 12 and 35' of the embodiment of FIG. 2 are slidably movable towards and away from one another so as to adapt to the specific configuration and size of the individual wheels 26 which are being locked. The operative position of each of the embodiments is shown in FIGS. 1 and 2. In such operative positions a central receiving opening as at 60 is provided through which a periphery or tread portion of each of the wheels as at 24 passes when the assemblies are in their locked position. This central receiving opening 60 is collectively defined by the various elements of the first and second clamp members 12 and 35 or 12 and 35'. This opening may be variable in size and configuration due to the fact, again, that these clamp members may be moved towards and away from one another and thereby adapt specifically to the size and configuration of the wheel 26.

Such is allowed by the connecting leg as at 22 of each of the embodiments of FIGS. 1 and 2 slidably movable within and along the length of the respective receiving sleeves 38. Similarly the locking elements 48 and 48', regardless of their configuration, may enter and move transversely through the interior of the lock casing 16. When in the desired relative positions, the two clamp members 14 and 35 and 14 and 35' are locked relative to one another such that these clamp members cannot be separated and the entire assembly 10 and 10' cannot be easily removed. This is accomplished through the provision of the lock 26 which may be a typical padlock or the like passing into the interior 18 of the lock casing and lock through one of the apertures 62 formed in either the locking element 48 or 48' as clearly pictured in FIGS. 5 and 13.

The overall shape of the casing 16 and the inner dimension of the hollow interior 18 is such that normal tools such as cutting tools or the like cannot easily enter into this interior and accordingly the lock 20 cannot be removed from its locked position as shown in FIGS. 10 and 15 without using the appropriate key or other conventional means to unlock the lock 20.

Now that the invention has been described:

What is claimed is:

1. A clamp assembly for a wheel of a trailer or like wheeled vehicle, said clamp assembly comprising:
   a) a first clamp member mounted adjacent an outer face of a wheel being clamped and a second clamp member movably connected to said first clamp member and disposed adjacent an inner face of the wheel,
   b) said first and second clamp members cooperatively configured and structurally adapted to collectively define a continuous, closed configuration in surrounding relation to a periphery of the wheel when said first and second clamp members are in an operative position,
   c) a locking assembly mounted on both said first and second clamp members and including a locking element having an elongated configuration and extending transversely through the wheel and secured adjacent outer and inner faces of the wheel to said first and second clamp members respectively,
   d) said locking assembly further including a lock and a casing, said casing mounted on said first clamp member and adapted to at least partially enclose said lock and to removably receive at least a portion of said locking element therein,
   e) said lock removably attached to said portion of said locking element within said casing and cooperatively adapted with said casing to resist removal of said locking element from said casing and from said transverse disposition relative to the wheel,
   f) a stabilizing means secured to said first clamp member adjacent said casing and adapted for engaging the outer face of the wheel in substantially overlying relation thereto,
   g) said locking element having an inner end fixedly secured to said second clamp member and movable therewith relative to said first clamp member and the wheel and an outer free end disposable into and transversely through said casing when said first and second clamp members are in said operative position, and
   h) said locking element being cooperatively configured to pass through openings in the wheel and including a plurality of apertures disposed in spaced relation to one another along a length of said locking member and being adapted to removably receive said lock therein.

2. An assembly as in claim 1 wherein said locking element comprises an elongate pin having a substantially cylindrical configuration, said plurality of apertures being disposed in spaced relation to one another along a length of said pin.

3. An assembly as in claim 1 wherein said locking element comprises an elongated bar having a substantially flat configuration, said plurality of apertures being disposed in spaced relation to one another along a length of said bar.

4. An assembly as in claim 1 wherein said stabilizing means comprises a plate member secured adjacent an outer end of said first clamp member and disposed and configured in overlying relation with a substantially center portion of the outer face.

5. An assembly as in claim 4 wherein said plate member includes an aperture formed therein, said aperture disposed and adapted to receive an axle end therein, the remainder of said plate disposed in surrounding relation thereto and having an inner surface of said plate disposed in confronting engagement with the outer face of the wheel.

6. An assembly as in claim 1 wherein said closed configuration further defines a substantially centrally disposed receiving opening adapted to allow passage of the wheel periphery therethrough.

7. An assembly as in claim 6 wherein said first and second clamp members are moveable towards and away from one another while in said operative position, said receiving opening having a variable dimension depending on a relative position of said first and second clamp members.

8. An assembly as in claim 7 wherein said first clamp member includes a base having an elongated configuration and including said casing attached substantially at one end and in overlying relation to the outer face of the wheel and in receiving relation to said locking element.

9. An assembly as in claim 8 wherein said first clamp member comprises a connecting leg secured along a length of said base in spaced relation to said casing and extending transversely outward therefrom in overlying relation to the wheel periphery and in movable attachment with said second clamp member.

10. An assembly as in claim 9 wherein said second clamp member comprises an elongated base having said locking element fixedly attached thereto and extending transversely outward therefrom and through the wheel into an interior of said casing.

11. An assembly as in claim 10 wherein said second clamp member comprises a sleeve member fixedly secured to said base of said second clamp element in spaced relation to said locking member and extending transversely outward therefrom in movably receiving relation to said connecting leg of said first clamp member.

12. An assembly as in claim 11 wherein said sleeve member is adapted to slidingly receive said connecting leg therein and in surrounding relation thereto.

13. An assembly as in claim 11 wherein said locking element and said sleeve member are in sliding positionable relation to said casing and said connecting leg respectively; said first and second clamp members movable toward and away from one another in collective surrounding relation to the periphery of the wheel when in said operative position.

* * * * *